United States Patent [19]

Renner, Jr. et al.

[11] 3,924,559

[45] Dec. 9, 1975

[54] SIGNALLING DEVICE FOR PREVENTING SPILL-OVER FROM THE FUEL TANKS OF POWERED BOATS DURING FILLING

[76] Inventors: Edmund W. Renner, Jr., 40 Chestnut Ave.; Frank P. Sule, 38 Chestnut Ave., both of Berlin, N.J. 08009; Wayne P. Sule, Chalet Apts., Blue Ridge-C, Pine Hill, N.J. 08021

[22] Filed: Oct. 31, 1974

[21] Appl. No.: 519,613

[52] U.S. Cl. .................. 116/109; 73/294; 116/112
[51] Int. Cl.² .................. G01F 23/00; G08B 21/00
[58] Field of Search ............. 116/112, 109; 141/95; 73/294, 291; 285/238; 137/558

[56] References Cited
UNITED STATES PATENTS

| | | | |
|---|---|---|---|
| 2,212,620 | 8/1940 | Scully et al. | 116/109 X |
| 2,227,323 | 12/1940 | Scully et al. | 116/109 X |
| 2,856,887 | 10/1958 | Scully | 116/109 |
| 2,964,009 | 12/1960 | Rudolf | 116/112 |
| 3,136,295 | 6/1964 | Gramo | 73/294 X |
| 3,767,233 | 10/1973 | Hodge | 285/239 |

*Primary Examiner*—Donald O. Woodiel
*Assistant Examiner*—Daniel M. Yasich
*Attorney, Agent, or Firm*—Nelson E. Kimmelman

[57] ABSTRACT

The device comprises two tubular extensions fixed respectively to the two opposing walls of a centrally located, generally cylindrical chamber. Those walls have respective central apertures in them which are aligned, as are both tubular extensions, on a common axis. In one form of the invention, a drain hole is located toward the periphery of the lower of the two walls of the chamber to prevent undue accumulation of liquid within the chamber. In another form, the tubular extensions have stepped, different diameter sections to accommodate different internal diameters of different hoses in which the extensions are inserted.

6 Claims, 6 Drawing Figures

U.S. Patent  Dec. 9 1975  3,924,559
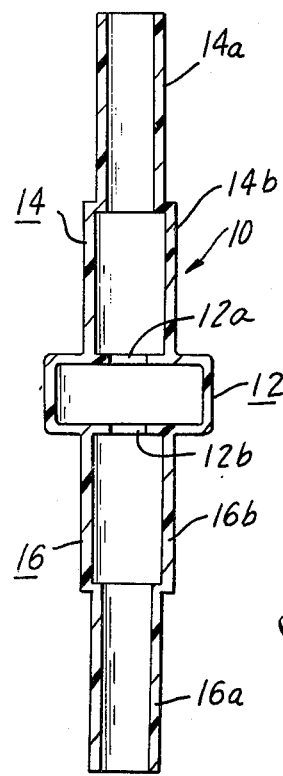
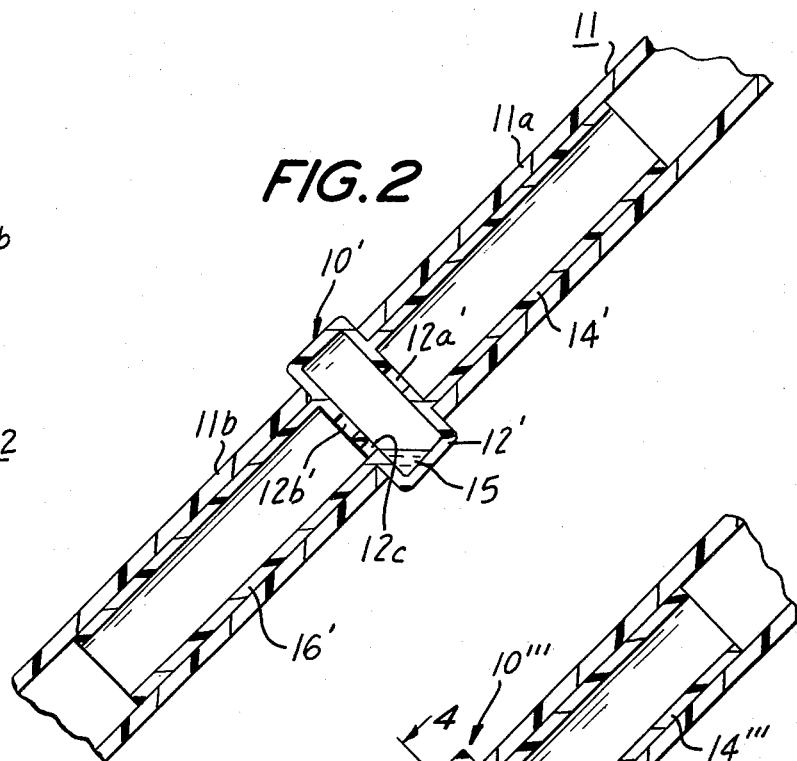
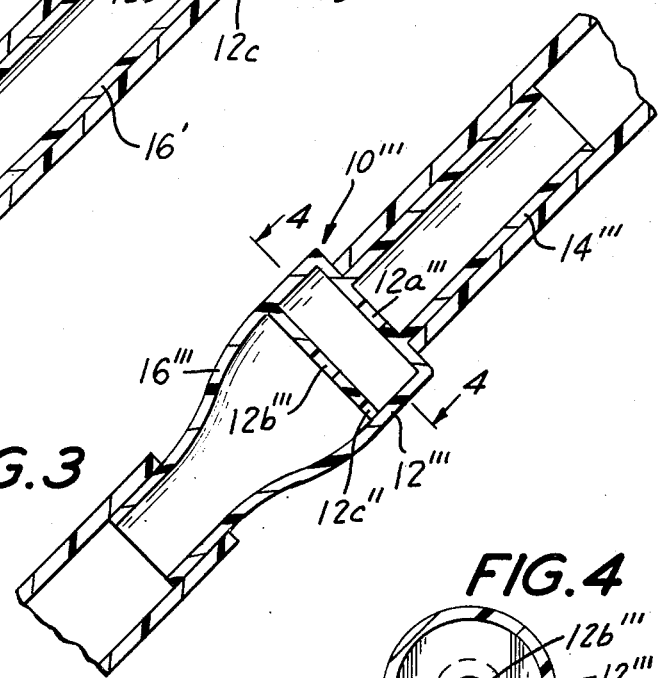
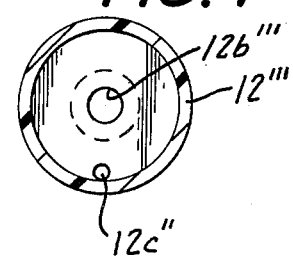
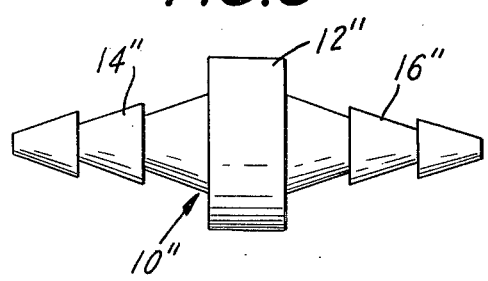
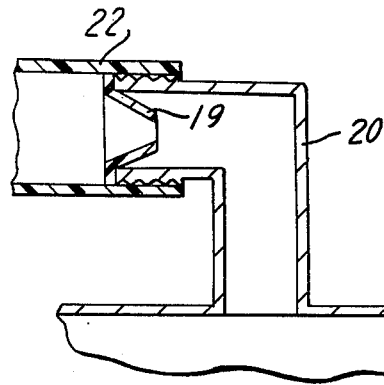

SIGNALLING DEVICE FOR PREVENTING SPILL-OVER FROM THE FUEL TANKS OF POWERED BOATS DURING FILLING

BACKGROUND OF THE INVENTION

Field of the Invention

Devices have been known which prevent spill-over of gas from the gas tank of a car, for example, when it is being filled. These are generally automatic and are actuated by back-pressure to turn off the supply and metering equipment. However, these automatic shut-off devices are relatively expensive and cannot be used to fill the tanks of most power boats. Devices are also known which are not automatic but which emit a loud sound such as a whistle as a fuel tank in a residence, for example, is being filled, the sound diminishing to inaudibility as the tank approaches the filled state. However, no such devices are known that are used to prevent spill-over from the gas tanks of powered boats during the filling operation. It is estimated that since there are several million power boats, and since spill-over is the rule rather than the exception as their tanks are filled, possibly as many as six million gallons of gas per year are wasted. Besides representing an exorbitant and unnecessary dissipation of an energy resource at a time of acute world shortage, the spill-over also pollutes the country's waterways. In order to prevent such waste and pollution, we have devised a device that may be inserted in the vent line of a fuel tank for powered boats. Preferably this device is made of a material that is highly resistant to the salt-corrosive air and water present where boats are usually used, and to the fuel also.

BRIEF SUMMARY OF THE INVENTION

A central, generally cylindrical chamber has two opposing walls in which aligned apertures are formed. Fixed to the outside of each wall are two aligned tubular portions. The device is inserted in series in the vent line of a fuel tank for a powered boat to produce a sound as the tank is being filled which stops when the tank is full thereby preventing spill-over.

BRIEF DESCRIPTION OF THE DRAWINGS

FIG. 1 is a side elevational, sectional view of one form of the device constructed in accordance with our invention;

FIG. 2 shows another form of our invention in side elevational, sectional view, inserted in the vent line of a boat gas tank;

FIG. 3 shows still another embodiment of the invention in side elevational, sectional view;

FIG. 4 is a sectional view taken along the section lines 4—4 in FIG. 3;

FIG. 5 is a side elevational view of still another form of the present invention; and FIG. 6 is a side elevational view of a device that enhances the operation of the present invention shown inserted at the end of the fitting for the fill line attached to the fuel tank of a boat.

DETAILED DESCRIPTION OF THE DRAWINGS

Referring to FIG. 1, there is shown indicated generally at the numeral 10, a device constructed in accordance with our invention. It comprises a central chamber 12 of generally cylindrical shape to which, on either side thereof, tubular extensions 14 and 16 are connected, the extensions being substantially co-axial with one another and with the chamber 12. The central chamber 12 has two aligned apertures 12a and 12b disposed along the common axis of the extensions 14 and 16. In the form of the invention shown in FIG. 1, the extensions 14 and 16 are stepped, having smaller terminal portions respectively 14a and 16a. These stepped portions permit different-sized flexible vent lines (such as line 11, FIG. 2) having different internal diameters to be affixed thereto with appropriate hose clips (not shown), for example. Of course, there may be more than two steps depending upon the number of differentsized vent lines into which the device is to be inserted in series. Another way of stepping the tubular portions on either side of the central chamber 12″ is shown in FIG. 5 wherein the similar device 10″ has tubular extensions 14″ and 16″ with steps generally in the shape of truncated hollow cones of increasing size. This configuration facilitates the insertion and adhesion of the device 10″ into the flexible vent line of powered boat gas tanks.

In actual use, the device such as the similar device (FIG. 2) 10′ (to be explained below) is inserted in series with the vent line at a certain distance, a foot or so, for example, from its terminal or free end. The vent line 11, if flexible, is severed at that point, hose clamps (not shown) are slipped over the immediately adjacent ends of the severed vent line portions 11a and 11b, the tubular extensions 14′ and 16′ are inserted into the ends of the vent line portions as far as possible and then the hose clamps are tightened. When the gas tank is being filled, the displaced air from the tank first proceeds out through the vent line portion 11b. Then it goes through the two aligned apertures of the central chamber producing a whistling sound, and thence out of the free end of the vent line portion 11a attached to the other extension until the tank is filled whereupon no more air and hence no further sound issues from the tank. The device may be made of metal or a rigid plastic, for example, the latter enabling it to be molded thereby saving on production cost. The plastic can be any salt water and gasoline-resistant type such as nylon, polyester, polypropylene, etc. The plastic can be opaque, translucent or transparent, the latter being desirable when it is wished to observe the interior of the central chamber for obstructions, etc.

In the somewhat different embodiment of FIG. 2, the extensions 14′ and 16′ of the device 10′ are uniform in their transverse cross-sections. They are shown inserted in the two sections 11a and 11b of the vent line which may be made of appropriate flexible plastic, rubber or other elastomeric material, for example. Such elastomeric material is most often used in the vent pipes of powered boats, but some diesel-powered boats use metal such as copper tubing for their vent lines. As in the embodiment shown in FIG. 1, the central chamber 12′ has two aligned central, axial apertues 12a′ and 12b′ formed in opposite, parallel sides thereof. As shown, these apertures have a constant diameter but it is understood that they can be formed with tapered walls if desired. The FIG. 2 embodiment, however, differs in having a drain hole 12c disposed in the lower parallel side of the cylindrical chamber 12′. This is to permit any fluid, such as gas, which may collect in the central chamber 12′ to run back into the gas tank except for the small pool 15 that collects in the corner as shown in FIG. 2.

FIG. 3 shows another form 10''' which is substantially the same as FIG. 2 except that its lower tubular extension 16''' bulges outwardly in the region where it joins the cylindrical chamber 12'''. It also includes an upper extension 14''' and has aligned apertures 12a''' and 12b''' constituting the sound-producing portion. Its drain hole 12c'', however, effectively drains off all liquid that may collect in the lower corner of the chamber 12''' by virtue of the location next to the corner itself. Of course, it is not necessary that the entire flared or bulbous portion 16''' be symmetrical, but only that the portion thereof lying adjacent to the drain hole 12c'' be enlarged.

In order to maximize the effect of the device 10 and its related other embodiments as shown, it is helpful to employ the generally funnel-shaped member 19, as shown in FIG. 6. The lower end of the fill pipe 22 is attached to the outer end of the filling inlet fitting attached to the fuel tank 21. The device 19 has the effect of maintaining the volume of sound issuing from the free end of the vent pipe more constant throughout the filling process. This may be due to the fact that sometimes, without the member 19, the gas stream entering into the tank may not fully occupy the entire cross-section of the inlet fitting or the fill pipe, for example. Thus, the displaced air, instead of escaping from the tank solely through the vent pipe, partially escapes through the fill pipe thereby reducing the volume of the sound coming through the devices explained above.

We claim:

1. A signalling device for insertion into the vent line connected to a liquid fuel tank of a boat comprising:
   a. a generally cylindrical chamber having two opposed generally parallel, substantially planar walls, said walls having substantially central apertures aligned with one another for producing an audible sound signal, and
   b. two substantially tubular members having generally circular cross-sections, each being fixed to the outside of one of said walls and being substantially aligned with one another and with said apertures in said wall, and being dimensioned to fit snugly and to be secured in place within said vent line.

2. The signalling device according to claim 1 wherein the overall diameter of said tubular members is smaller than the diameter of said walls of said chamber.

3. The signalling device according to claim 2 wherein the cross-section of at least one of said members at its inner terminal end, which is fixed to the outside of one of said chamber walls, is substantially congruous with the cross-section of the one of said walls to which it is attached.

4. The signalling device according to claim 2 wherein said vent line is to be disposed in a position at an appreciable angle to the vertical and wherein at least one of said opposed walls is provided with a drain hole considerably smaller than said aligned central apertures situated just inside of the inner surface of the the tubular member affixed to said one wall, said drain hole being positioned to be at substantially the lowest point of said chamber when said device is inserted into said vent line.

5. The device according to claim 4 wherein said one member has a generally bulbous shape adjacent its inner terminal end and said other member has a substantially uniform cross-section throughout.

6. A signalling device for use in the vent line of a liquid tank for a boat comprising:
   a. a generally cylindrical chamber having two opposed, substantially planar walls with aligned apertures each member being dimensioned to fit snugly and to be secured in place in said vent line formed respectively therein for producing an audible sound signal, and
   b. two generally tubular members, each member being fixed to the outside of one of said walls, said members being substantially in alignment with one another and with said apertures.

* * * * *

UNITED STATES PATENT OFFICE
CERTIFICATE OF CORRECTION

PATENT NO. : 3,924,559
DATED : December 9, 1975
INVENTOR(S) : Edmund W. Renner, Jr. et al It is certified that error appears in the above-identified patent and that said Letters Patent are hereby corrected as shown below:

Claim 6, line 1, change "use in" to --insertion into--.

line 2, after "liquid" insert --fuel--.

line 5, delete "each member being dimensioned to fit snugly".

line 6, delete "and to be secured in place in said vent line".

line 12, after "apertures" insert --, each member being dimensioned to fit snugly and to be secured in place in said vent line--.

Signed and Sealed this ninth Day of March 1976

[SEAL]

Attest:

RUTH C. MASON
*Attesting Officer*

C. MARSHALL DANN
*Commissioner of Patents and Trademarks*